Dec. 8, 1964     W. C. SPINDLER     3,160,531

GALVANIC CELL ELECTRODE

Filed Feb. 24, 1961

WILLIAM C. SPINDLER
*INVENTOR.*

BY *J. M. St. Amand*

*ATTORNEY*

United States Patent Office 3,160,531
Patented Dec. 8, 1964

3,160,531
GALVANIC CELL ELECTRODE
William C. Spindler, Arlington, Calif., assignor to the United States of America as represented by the Secretary of the Navy
Filed Feb. 24, 1961, Ser. No. 91,551
4 Claims. (Cl. 136—120)
(Granted under Title 35, U.S. Code (1952), sec. 266)

The invention herein described may be manufactured and used by or for the Government of the United States of America for governmental purposes without the payment of any royalties thereon or therefor.

The present invention relates to voltaic cell cathodes and more particularly to high current, high voltage cathodes utilizing metal oxides in the glassy state.

Metal oxides used in the present device include all those useful in voltaic cells and which can be prepared in the glassy state by suitable choice of conditions and ingredients. The glassy state is one in which a short-range crystal structure may exist, but not a macroscopic long-range ordered structure. The present glassy electrodes are not to be confused with the glass electrode in common use for pH measurements; the latter is merely a glass membrane permeable to certain ions and does not enter the electrochemical cell reaction, as do the electrodes of the present invention.

Metal oxides have been used as cathodes and depolarizers in the majority of presently available voltaic cells, as powders, compacts, solutions, suspensions, platings, etc.; but never have metal oxides been employed in the glassy state as in the present invention. The nearest previous known approach is a cathode mixture comprising powders of vanadium-pentoxide and boric-anhydride; although both of these materials are known to be glass formers or promoters, the product formed upon cooling a molten mixture is crystalline and not glassy. One disadvantage of this previous cathode is its easy permeation by lithium-chloride–potassium-chloride fused salt electrolyte and consequent loss of effectiveness; practical utilization demands addition of vanadium-pentoxide to the electrolyte, which introduces more complications.

In the present invention, metal oxides combined with glass-forming substances to yield vitreous substances are utilized as voltaic cell cathodes for the first time. Glasses, in the sense that they enter into the energy-producing electro-chemical reaction of the cell, are used for the first time as voltaic cell electrodes. The energy obtainable in discharge of the cell is of a sufficient and practical level for doing external work, and is not of a low level that limits the cathode to mere reference electrode functions. The glassy state electrodes, as used in the present device, permit a new freedom of design choice to battery engineers not heretofore available with previously known electrodes. Since many different glasses can be compounded, different voltage levels can be achieved, and even mixed potentials are possible through the use of more than one reducible metal oxide in an electrode. Physical, chemical and electrical properties of battery cathodes can now be modified in the glassy state in ways not otherwise obtainable.

It is an object of the present invention to provide a new and improved voltaic cell cathode.

Another object of the invention is to provide a high current, high voltage electric cell cathode utilizing metal oxides in the glassy state.

Still another object of the invention is to provide a new and improved electrode for use in electric cells utilizing a fused salt electrolyte.

A further object of the invention is to provide new and improved volatic cells using glasses, that enter into the energy-producing electrochemical reaction of the cell, as the cell cathodes.

Other objects and many of the attendant advantages of this invention will become readily appreciated as the same becomes better understood by reference to the following detailed description when considered in connection with the accompanying drawings wherein.

Figure 1:
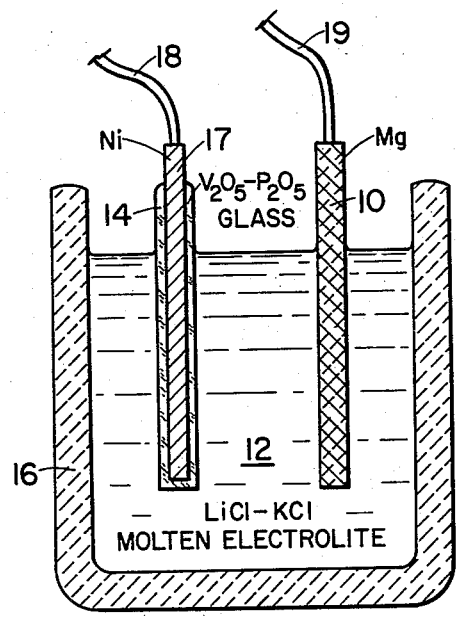
FIGURE 1 is an example of a single electric cell embodying the invention, shown in cross-section.

The invention involves, in its simplest form as shown in FIGURE 1, an electric cell having a metal anode 10, of magnesium, calcium, lithium or alloys thereof, for example, a fused salt electrolyte 12, such as LiCl—KCl, and a cathode 14 of a glassy-state metal oxide, such as $V_2O_5$—$P_2O_5$ for instance, contained within a crucible 16. The cathode material 14 may be coated onto a metal conductor 17, of nickel or aluminum for example. Lead wires 18 and 19 provide connection to an external circuit.

Figure 2:
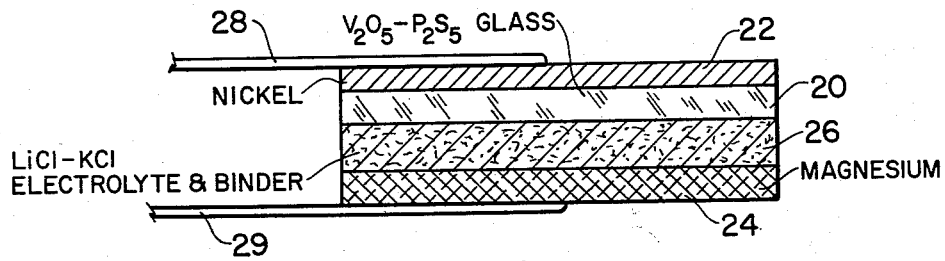
FIGURE 2 shows an example of a flat-cell embodiment of the present invention, shown in cross section.

FIGURE 2 shows a flat cell, by way of example, wherein a metal oxide glass 20, of $V_2O_5$—$P_2S_5$ for example, forms the cathode coated onto a flat metal plate of nickel 22. A flat plate of magnesium 24 comprises the cell anode. The two electrodes are separated by a fused salt electrolyte 26, in a matrix or binder of kaolin for example to retain the electrolyte in place. Leads 28 and 29 provide electrical connecting tabs from the cell to an external circuit. A plurality of such flat cells can be stacked and suitably encased to form a battery.

Construction of the invention requires proper choice of a metal oxide for the reducible cathode material plus one or more glass promoting materials which will combine with the metal oxide to form a glass. Transition metal oxides are the most commonly used for cathodes or depolarizers and $SiO_2$, $B_2O_3$ and $P_2O_5$ are the principal glass formers. Not all combinations can be made into stable glasses. However, one which is very simple to make is $V_2O_5$—$P_2O_5$ glass; the two substances can be directly melted in an open crucible with a little as 11% $P_2O_5$ by weight and easily cooled to a homogeneous black vitreous mass. Another example of cathode material with similar composition is $MoO_3$—$P_2P_5$. Also $V_2O_5$—$B_2O_3$ crystalline material can be converted to the glassy state by addition of $P_2O_5$. A composition found to be suitable for a cathode comprises 85–10–5% by weight of $V_2O_5$—$P_2O_5$—$B_2O_3$ respectively. Mixed potentials can be achieved by making glasses with two or more metal oxides, such as $MoO_3$—$V_2O_5$.

In addition to oxide glass formers, many non-oxide glass formers can be used; for example, inorganic sulfides, selenides and tellurides. One suitable cathode glass, for example, was made of 80–20 weight percent $V_2O_5$—$P_2S_5$.

To utilize the glass in a voltaic cell, it must be melted and cast in an appropriate geometry and suitable contact provided for connection to an external circuit, and used with an appropriate electrolyte. In a cell employing a liquid electrolyte reservoir with immersion-type electrodes, such as shown in FIGURE 1, the cathode glass can be cast around a central wire to form good electrical connection. In a cell employing flat components, such as shown in FIGURE 2, the glass can either be cast into a slab and ground flat for contact to one side of a metal plate or coated thereon. The cathode glass can also be fused onto a metal plate as a vitreous enamel coating using a powdered frit or a mixture of the raw powders, or be coated directly from a melt by dipping or pouring. The most suitable metals for these purposes have been found to be nickel, steel, stainless steel, and aluminum, but many others could be feasible.

An example of cell performance is given below for a number of cathodes. The electrolyte was the eutectic LiCl—KCl in a crucible at 375° C., for the first two examples, and at 450° C. for the third and fourth examples. The fifth example used 10–90 wt. percent $$LiCl—CH_3CONH_2$$

electrolyte at 150° C. The external circuit load was adjusted to give 100 ma./cm.² current density based on the area of the glass cathode. The time, in seconds, indicates the accumulative elapsed time from start of cell activation until voltage reading was taken.

can be obtained from $H_3BO_3$ and $P_2O_5$ from $HPO_3$; also the mixture of $B_2O_3$ and $P_2O_5$ can be introduced as $BPO_4$. The LiCl—KCl electrolyte preferred composition is eutectic (approximately 45 wt. percent LiCl) because it has the lowest melting point of all other mixtures; however, useful cell performance can be had with as little as 35 or as much as 55 wt. percent LiCl. While $$V_2O_5—P_2O_5$$

| Cathode | Anode | Electrolyte and Temperature | Open Circuit Voltage | Closed Circuit Voltage | Time (Seconds) |
|---|---|---|---|---|---|
| $V_2O_5—P_2O_5$ on Ni, 80–20 wt. percent | Mg | LiCl—KCl, 375° C | 2.97 | | 10 |
| | | | 2.85 | | 30 |
| | | | | 2.71 | 40 |
| | | | | 2.22 | 240 |
| | | | 2.01 | | 600 |
| $V_2O_5—P_2O_5$ on Al, 80–20 wt. percent | Mg | LiCl—KCl, 375° C | 2.95 | | 10 |
| | | | 2.87 | | 30 |
| | | | 2.52 | | 1,140 |
| | | | | 2.28 | 1,150 |
| $V_2O_5—P_2S_5$ on Ni, 80–20 wt. percent | Mg | LiCl—KCl, 450° C | 2.52 | | 10 |
| | | | 1.84 | | 30 |
| | | | | 1.56 | 40 |
| | | | 1.68 | | 70 |
| $V_2O_5—P_2O_5—B_2O_3$ on Ni, 85–10–5 wt. percent | Mg | LiCl—KCl, 450° C | 2.86 | | 10 |
| | | | 1.90 | | 30 |
| | | | | 1.62 | 40 |
| | | | 1.83 | | 300 |
| $MoO_3—P_2O_5$, 80–20 wt. percent | Mg | LiCl—$CH_3CONH_2$, 150° C | 1.70 | | 10 |
| | | | 1.60 | | 60 |

$V_2O_5—BPO_4$ (80–20 wt. percent) glasses also were made for glass cathodes that appear similar to the $V_2O_5—P_2O_5$ glasses discussed above. Useful performance levels were obtained for many other glasses, including the sulfide glasses and including other mechanical arrangements of cell components than the examples listed in the above table.

Vitreous enamels and glasses represent a type of physical structure which has never been utilized for electrochemical reactions at voltaic cell electrodes. The advantages of a glass cathode over another type will depend upon a multitude of factors, but having a wider choice of materials for design, the variety of properties possible in glasses will certainly be found to be helpful in many ways. The cell test data given above, for example, shows that a hard vitreous coating can give the full open circuit potential of the $V_2O_5$ independently of the metal backing (indicating impermeability to electrolyte), yet enter the electrochemical cell reaction efficiently (indicated by the very high current density of discharge). Other glasses might be chosen because they offer a different voltage level, where compatible with other cell components or for a plurality of reasons. The higher density of a glass cathode compared to a powdered one (such as $MnO_2$—C) may permit operation as an "extended" cathode in the electrolyte, but at a higher efficiency because of closer proximity to the source of electrons (metal conductor external circuit). Adhesion of vitreous enamels to metals is an advantage not possessed by powder compacts, and hardness is another. Modification of electrical conductivity of a metal oxide by converting to the glassy state may be advantageous in certain applications, such as changing the slope of the conductivity-temperature curve. Glass cathodes will be fluid below the normal melting point of the metal oxide permitting their use in some desired combination with materials not otherwise applicable. The $V_2O_5—P_2O_5$ glass, for example, can be coated on aluminum and magnesium, but $V_2O_5$ cannot because its melting point exceeds that of these two metals.

In making the vitreous materials for the cathodes $B_2O_3$ glass cathode cells do not require addition of depolarizing agent to the electrolyte for cell operation, nonetheless additional performance will result by such addition of larger quantities of $V_2O_5$ on occasions where longer periods of discharge are desired and when reasonably thin glass coatings are used to favor high current discharge.

Obviously many modifications and variations of the present invention are possible in the light of the above teachings. It is therefore to be understood that within the scope of the appended claims the invention may be practiced otherwise than as specifically described.

1. In a voltaic cell a glass cathode consisting of 80–20 wt. percent $V_2O_5—P_2S_5$ melted together to form a homogeneous vitreous material.

2. In a voltaic cell a glass cathode consisting of 80–20 wt. percent $MoO_3—P_2O_5$ melted together to form a homogeneous vitreous material.

3. In a voltaic cell a glass cathode consisting of 85–10–5 wt. percent $V_2O_5—P_2O_5—B_2O_3$ melted together to form a homogeneous vitreous material.

4. In a voltaic cell a glass cathode consisting of 80–20 wt. percent $V_2O_5—P_2O_5$ melted together to form a homogeneous vitreous material.

References Cited by the Examiner
UNITED STATES PATENTS

| | | | |
|---|---|---|---|
| 2,518,194 | 8/50 | Silverman | 106—47 |
| 2,631,180 | 3/53 | Robinson | 136—153 |
| 2,718,539 | 9/55 | Bradshaw et al. | 136—153 |
| 2,786,088 | 3/57 | Robinson | 136—153 |
| 2,894,053 | 7/59 | Louzos | 136—153 |

OTHER REFERENCES

Goodrich et al.: Journal of the Electrochemical Society, vol. 99, January–December 1952, pages 207C–208C.

JOHN H. MACK, *Primary Examiner.*

JOHN R. SPECK, MURRAY TILLMAN, *Examiners.*